United States Patent [19]
Haratani et al.

[11] Patent Number: 5,401,609
[45] Date of Patent: Mar. 28, 1995

[54] OPTICAL RECORDING MEDIUM AND ITS PRODUCTION

[75] Inventors: Susumu Haratani; Junji Tominaga, both of Nagano, Japan

[73] Assignee: TDK Corporation, Tokyo, Japan

[21] Appl. No.: 257,578

[22] Filed: Jun. 9, 1994

Related U.S. Application Data

[63] Continuation of Ser. No. 988,834, Dec. 10, 1992, abandoned.

[30] Foreign Application Priority Data

Dec. 13, 1991 [JP] Japan ................... 3-352006

[51] Int. Cl.⁶ ........................................... G11B 1/24
[52] U.S. Cl. ..................................... 430/270; 430/271; 430/495; 430/945; 346/135.1; 369/288; 369/284
[58] Field of Search ............... 430/495, 945, 270, 271; 346/135.1; 369/288, 284, 283

[56] References Cited

U.S. PATENT DOCUMENTS

| | | | |
|---|---|---|---|
| 4,300,227 | 11/1981 | Bell .................. | 346/135.1 |
| 4,360,895 | 11/1982 | Cornet ................ | 346/135.1 |
| 4,370,391 | 1/1983 | Mori et al. .......... | 430/945 |
| 4,404,656 | 9/1983 | Cornet ................ | 365/126 |
| 4,606,017 | 8/1986 | Broer et al. ........ | 369/288 |
| 4,845,515 | 7/1989 | Suh ................... | 345/135.1 |
| 4,855,992 | 8/1989 | Ikegawa et al. ...... | 346/135.1 |
| 4,908,294 | 3/1990 | Kanno et al. ........ | 346/135.1 |
| 4,916,048 | 4/1990 | Yamada et al. ....... | 430/945 |
| 5,112,701 | 5/1992 | Katsuragawa ......... | 428/900 |
| 5,219,708 | 6/1993 | Hirata et al. ....... | 430/495 |
| 5,252,370 | 10/1993 | Tominaga et al. ..... | 430/945 |

FOREIGN PATENT DOCUMENTS

| | | | |
|---|---|---|---|
| 0432038 | 6/1991 | European Pat. Off. ............ | 369/284 |
| 58-87183 | 5/1983 | Japan . | |
| 4-298389 | 1/1989 | Japan . | |
| 64-79954 | 3/1989 | Japan ............................... | 369/288 |

OTHER PUBLICATIONS

Kirk-Othmer "Encyclopedia of Chemical Techology" ©1980 pp. 250-252 & 255-258.
SPIE, vol. 1078; Optical Data Storage Topical Meeting; 80 Jan. 23, 1989; Nikkei Electronics; No. 465; p. 107.

Primary Examiner—Charles L. Bowers, Jr.
Assistant Examiner—Martin J. Angebranndt
Attorney, Agent, or Firm—Watson, Cole, Grindle & Watson

[57] ABSTRACT

An optical recording medium includes on the surface of a substrate a recording thin film, a thin film of dielectric material and a reflecting thin film in this order, characterized in that said recording thin film contains Ag, M and O or Fe, M and N, wherein M is at least one member selected from the group consisting of Ni, Ti, Co and Cu. The optical recording medium further includes between the substrate and the recording thin film and on the substrate a surface layer having a glass transition point lower than that of the substrate.

8 Claims, 1 Drawing Sheet

OPTICAL RECORDING MEDIUM AND ITS PRODUCTION

This application is a File Wrapper Continuation Application of application Ser. No. 07/988,834, filed 10 Dec. 1992, now abandoned.

BACKGROUND OF THE INVENTION

1. Field of the Invention

The present invention relates to an optical recording medium and a method of producing such a medium.

2. Statement of the Prior Art

As mass information recording media, the importance of optical recording media, such as optical recording discs has gradually increased, recently. Among the optical recording media, there are an erasable type of optical recording medium such as a phase change type or an magneto-optical type of optical recording medium and a write-once type of optical recording medium such as a pit formation type of optical recording medium.

In recent years, there have been proposed optical recording media that enable additional writing or recording in conformity with the compact disc (hereinafter CD for short) standards. For instance, see "Nikkei Electronics", No. 465, page 107 (Jan. 23, 1989), and "SPIE", Vol. 1078, Optical Data Storage Topical Meeting, 80 (1989), held at the Osaka Science & Technology Center on Mar. 3, 1989 by the corporation, Kinki Chemical Association, the section of functional dyes. These optical recording discs each include on a transparent resin substrate a dye layer, an Au reflecting layer and a protecting layer, which are laminated thereon in this order. More specifically, the reflective layer is directly in contact with the dye layer.

Because of using an organic dye, however, this optical recording disc shows material degradation under severe weather conditions, especially under ultraviolet rays in the solar light and so on. This is a special disadvantage for information storing mediums which have to maintain high reliability for a long time after recording.

Under the situations mentioned above, the inventors have come up with optical recording media each including a recording thin film using an inorganic compound that decomposes by laser heating and releases gases, more specifically, silver oxide or iron nitride instead of organic dyes (Japanese Patent Application Nos. 3-119474 and 3-221025).

These optical recording media show high resistance to light and high reliability, as compared with media using dyes. However, a problem with these media is that, when they are stored over an extended period under severe conditions of high temperature, high humidity, etc., there are increases in cross talks and jitters.

An object of the invention is therefore to provide an optical recording medium including a recording thin film having high reliability to light and using an inorganic compound, which has a reflectivity of more than 70% in connection with a dielectric layer and a reflector. This disc is fully compatible to present CDS when reproduced.

SUMMARY OF THE INVENTION

According to the invention, the object mentioned above is achieved by the following specific aspects (1)–(11):

(1) An optical recording medium characterized by including on the surface of a substrate a recording thin film a dielectric thin film and a reflecting thin film in this order, said recording thin film containing Ag, M and O or Fe, M, and N, wherein M is at least one member selected from the group consisting of Ni, Ti, Co and Cu.

(2) An optical recording medium as recited in (1), which includes between said substrate and said recording thin film and on said substrate a surface layer having a glass transition point lower than that of said substrate.

(3) An optical recording medium as recited in (2), wherein said substrate comprises polyolefin and said surface layer comprises polycarbonate.

(4) An optical recording medium characterized by including on the surface of a substrate a dielectric thin film, a recording thin film and a reflecting thin film in this order, said recording thin film containing Ag, M and O or Fe, M and N, wherein M is at least one member selected from the group consisting of Ni, Ti, Co and Cu.

(5) An optical recording medium as recited in any one of (1) to (4), wherein said recording thin film has an M/(Ag+M) or M/(Fe+M) that exceeds 0 and is up to 0.5 in atomic ratio.

(6) A process for producing an optical recording medium as recited in any one of (1) to (5), characterized in that said recording thin film is formed by reactive sputtering.

(7) A process for producing an optical recording medium as recited in (6), wherein said recording thin film is formed by reactive sputtering in an oxygen gas-containing atmosphere, using Ag and M as the targets.

(8) A process for producing an optical recording medium as recited in (7), wherein the flow rate of the oxygen gas lies in the range of 10 to 70% with respect to the total flow rate of all the gases.

(9) A process for producing an optical recording medium as recited in (6), wherein said recording thin film is formed by reactive sputtering in a nitrogen gas-containing atmosphere, using Fe and M as the targets.

(10) A process for producing an optical recording medium as recited in (9), wherein the flow rate of the nitrogen gas lies in the range of 10 to 20% with respect to the total flow rate of all the gases.

(11) A process for producing an optical recording medium as recited in any one of (7) to (10), wherein said reactive sputtering takes place at a pressure of $3 \times 10^{-1}$ to 1.0 Pa.

BRIEF DESCRIPTION OF THE DRAWINGS

Two preferable embodiments of the optical recording medium according to the invention will now be described, by way of example alone, with reference to the accompanying drawings.

DETAILED DESCRIPTION OF THE INVENTION

Figure 1:
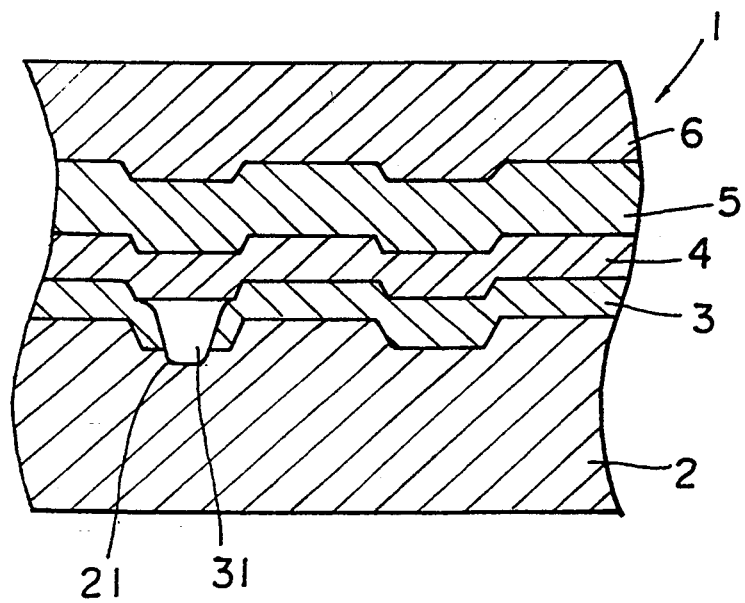
FIG. 1 illustrates in partial section one preferable embodiment of the optical recording medium according to the invention.

The first embodiment of the optical recording medium according to the invention will now be explained with reference to FIG. 1. For recording, a substrate 2 is irradiated with recording laser light from its back or rear side, so that a recording thin film 3 is heated. When the recording thin film 3 contains silver (Ag) and oxygen (O), they are usually present in the form of silver oxide. Upon being heated, the silver oxide is decomposed into Ag and $O_2$ at about 160° C. Alternatively, when the recording thin film 3 contains iron (Fe) and nitrogen (N), they exist ordinarily in the form of iron nitride that then releases nitrogen at about 200° C. As illustrated, a void 31 is formed in the recording thin film 3 by the resultant gas. Since the resin substrate 2 in the vicinity of the recording thin film 3 is heated and so softened, there is provided a niche or recess 21 in the interface between the substrate 2 and the thin film 3 by the pressure of the resulting gas.

The formation of these voids and niches gives rise to a change in such optical conditions as the optical constant and optical path length of the region of the substrate irradiated with recording laser flight, resulting in a reflectivity drop. A further reflectivity drop is caused as well by the fact that the bottom of each niche is roughened.

The changes in light reflectivity, because of being irreversible, may be applied to a write-once type of optical recording medium. Then, the light reflectivity in the vicinity of 780 nm used for CDs is more than 70% before laser light irradiation and drops to about 50% or lower, especially about 20% or lower after the irradiation, so that it can be applied to a write-once type of optical recording disc conforming to the CD standards. In addition, it is possible to effect short wavelength recording so as to achieve a higher recording density, because such changes in reflectivity are obtained in the wavelength range of about 300 to 900 nm by adjusting the thickness of the dielectric thin film, etc.

In the first embodiment, if the interface between the substrate 2 and the recording thin film 3 has a lower glass temperature than that of the bulk substrate, it is then possible to obtain a high-enough recording sensitivity, even when the substrate is made of polyolefin or other material having a high hardness.

Reference will now be made to the second embodiment of the optical recording medium shown in FIG. 2. As the recording thin film 3 is irradiated by recording laser light, it gives out gas, by which a void 32 is formed in the recording thin layer 3 and by the pressure of which a niche or recess 51 is formed in a reflecting thin film 5. The formation of these voids and niches gives rise to a change in such optical conditions as the optical constant and optical path length of the region of the substrate irradiated by recording laser light, resulting in a reflectivity drop. A further reflectivity drop is also caused by the light scattering on the surface of each niche 51. This process to produce holes created by a laser beam is irreversible, that is, this invention can be applied to a write-once type of optical recording medium.

In the second embodiment, a dielectric thin film 4 has a role to rebound the pressure which is released by a gas explosion to the surface of the substrate.

In each of the embodiments mentioned above, the M contained in the recording thin film has a role to prevent any degradation of the properties of this optical recording medium, when stored under high-temperature and high-humidity conditions over an extended period. More illustratively, the degradation of cross talks and jitters can be inhibited or limited.

In this connection, it is noted that JP-B-63-56920 discloses an "optical recording material characterized by being composed of an $Ag_2O$-$SiO_2$ type compound". This optical recording material makes use of the property of the $Ag_2O$-$SiO_2$ type compound that it blackens upon irradiated by light and fades upon heated, and differs in construction from the optical recording medium of this invention wherein the dielectric thin film containing silicon oxide is laminated on the recording thin film containing silver oxide. Therefore the dielectric film and the recording film exist separately. This prior art optical recording medium is quite different in action from the optical recording medium of the previous invention as well. According to the disclosure of this publication, the optical recording material has an initial reflectivity less than 40% and a reflectivity drop of barely 8% after irradiated by light. This indicates that some difficulty is involved in using it as an optical recording medium and, in particular, as an optical recording medium conforming to the CD standards.

ILLUSTRATIVE CONSTRUCTION OF THE INVENTION

In what follows, the illustrative construction of the invention will be described at great length.

Figure 2:
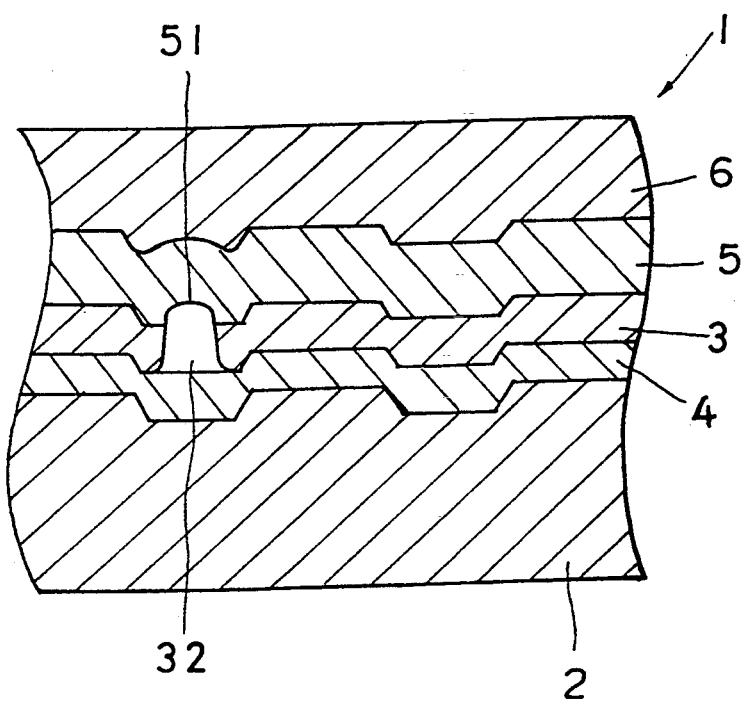
FIG. 2 represents in partial section another preferable embodiment of the optical recording medium according to the invention.

The first optical recording medium 1 shown in FIG. 1 includes on the surface of the substrate 2 the recording thin film 3, the dielectric thin film 4 and the reflecting thin film 5 with a protective layer 6 located on the reflecting thin film 5, and the second optical recording medium 1 shown in FIG. 2 has on the surface of the substrate 2 the dielectric thin film 4, the recording thin film 3 and the reflective thin film 5 with a protective layer 6 provided on the reflective thin film 5.

SUBSTRATE 2

The substrate 2 of the optical recording medium 1 must be transparent for a recording laser beam and a reading laser beam, because the recording thin film 3 must be irradiated by the beams through the substrate 2. In the first embodiment, the substrate 2 should preferably be made of resin, because it is required to form the niches in the substrate 2 by the pressure of the gas released from the recording thin film 3. More illustratively, use may be made of acrylic resin, polycarbonate, epoxy resin, polyolefin and other like resins.

The polyolefin, because of its low water permeability, serves to prevent any degradation of the recording thin film and assures high reliability. Due to its relatively higher hardness than the other resin, however, the polyolefin has some difficulty in forming the niches 21 on the surface of the substrate shown in FIG. 1, when applied to the substrate material according to the first embodiment, making recording sensitivity unfavorable. For this reason, when a polyolefin substrate is used, it is preferred that a surface layer for the substrate having a glass transition point lower than that of the substrate is located between the substrate and the recording layer, thereby making the formation of the niches 21 so easy that recording sensitivity and modulation can be improved.

The polyolefin substrate has generally a glass transition point of about 120° to 150° C., but it is preferable that the glass transition point of the surface layer of the substrate is lower than that of the substrate by about 10° to 20° C.

The glass transition point of the surface layer of the substrate may be measured by irradiating the substrate with laser light while it is heated, and analyzing the resulting scattered light with the use of a spectrophotometer.

It is noted that the surface layer for the substrate is useful not only for the polyolefin substrate but also for substrates that have a relatively higher hardness. For instance, providing the substrate with a surface layer makes it possible to use a glass substrate that is of high water permeability but is unlikely to deform.

No particular limitation is imposed on what type of material forms the surface layer for the substrate. However, it is preferable to use polycarbonate, because it is easy to deform and makes a great contribution to improving recording sensitivity.

No particular limitation is placed on how to form the polycarbonate surface layer. Usually, however, it is preferable to dissolve polycarbonate in a solvent such as tetrahydrofuran to prepare a coating solution and applying the coating solution onto the surface of the substrate as by spin coating, followed by drying.

Although not critically limited, the surface layer of the substrate should have a thickness of 100 Å or more, particularly 400 Å or more so as to achieve an effect improving recording sensitivity to high-enough levels. While there is no upper limit to the thickness of the surface layer, there is no need of allowing the surface layer to have a thickness exceeding 1,000 Å.

In addition to the above-mentioned embodiment wherein the surface layer is provided independently of the substrate, there is another embodiment wherein a region in the vicinity of the surface layer of the polyolefin substrate is formed as a surface layer for the substrate by lowering the glass transition point of such a region. Details of this embodiment are set forth in Japanese Patent Application No. 3-18505; a polyolefin substrate—in which the glass transition point of some region in the vicinity of the surface layer of the substrate is lower than that of some region in the vicinity of the central layer of the substrate—may be obtained by injection-molding at an injection pressure of about 250 to 400 kg/cm$^2$, a melting temperature of about 300° to 400° C. and a mold temperature of about 80° to 120° C. under otherwise ordinary conditions for, e.g., dwelling and molding locking force.

While no particular restriction is placed on the configuration and size of the substrate 2, it may usually be in the form of a disc that has usually a thickness of about 0.5 to 3 mm and a diameter of about 50 to 360 mm.

If required, the substrate 2 may be provided on its surface with a given, grooved or otherwise formed pattern for tracking, addressing and other purposes. In the illustrated example, by way of example, the optical recording medium is provided with grooves that are to be irradiated by recording light.

RECORDING THIN FILM 3

The recording thin layer 3 contains Ag, M and O or Fe, M and N, wherein M is at least one member selected from the group consisting of Ni, Ti, Co and Cu.

In the recording thin film 3, it is preferable that the atomic ratio M/(Ag+M) or M/(Fe+M) exceeds 0 and is up to 0.5, especially, lies between 0.2 and 0.4. When the ratio of M is below the lower limit, an effect on inhibiting cross talks and jitters becomes insufficient, whereas when the ratio of M is above the upper limit, so large is a reflectivity change that even when the dielectric thin film is selected as an optimum thickness, a reflectivity of 70% or less is obtained.

Of the metals represented by M, the most preference is given to Ni, and it is more preferable that the atomic ratio mentioned above ranges from 0.2 to 0.3.

When the recording thin film 3 contains Ag, M and O, the content of O therein should preferably range from 5 to 50 atomic %, especially, 10 to 30 atomic %. Alternatively, when the recording thin film 3 contains Fe, M and N, the content of N therein should preferably range from 5 to 50 atomic %, especially, 10 to 30 atomic %. Although the recording thin film 3 is preferably made up of the above-mentioned elements alone, it may contain other elements such as Sn and Zn in the total amount of up to about 10 atomic %.

It is understood that in the recording thin film 3 Ag, Fe and M exist in the form of their oxides or nitrides.

The thickness of the recording thin film 3 should preferably lie in the range of 600 to 1,500 Å, more particularly 700 to 1,200 Å in the case of the first embodiment and in the range of 500 to 1,000 Å in the case of the second embodiment. At below the lower limit some difficulty is involved in recording, whereas at above the upper limit the recording thin film absorbs light, giving an insufficient reflectivity.

Preferably, the recording thin film 3 is formed by such vapor phase epitaxy procedures as sputtering or vapor deposition. More preferably, however, it is formed by reactive sputtering that introduces oxygen or nitrogen gas as the reactive gas.

When a recording thin film containing Ag, M and O is formed, it is preferable that reactive sputtering is carried out in an oxygen gas-containing atmosphere, using Ag and M as the targets. Preferably, the oxygen gas is used in combination with an inert gas such as Ar gas and at a flow rate of 10 to 70% with respect to the total amount of all the gases. When there is a departure of the oxygen gas flow rate from the range just mentioned above, the amount of nitrogen in the recording thin film becomes so inappropriate that no sufficient recording sensitivity can be obtained.

When a recording thin film containing Fe, M and N is formed, it is preferable that reactive sputtering is carried out in a nitrogen gas-containing atmosphere, using Fe and M as the targets. Preferably, the nitrogen gas is used in combination with an inert gas such as Ar gas and at a flow rate of 10 to 20% with respect to the total amount of all the gases. When there is a departure of the nitrogen gas flow rate from the range just mentioned above, the amount of nitrogen in the recording thin film becomes so inappropriate that no sufficient recording sensitivity can be obtained.

These sputtering procedures are carried out at a pressure of preferably $3 \times 10^{-1}$ to 1.0 Pa, more preferably $5 \times 10^{-1}$ to $9 \times 10^{-1}$ Pa, and most preferably $5 \times 10^{-1}$ to $8 \times 10^{-1}$ Pa.

It is noted that a DC sputtering procedure may be used for reactive sputtering, but preference is given to using a high-frequency sputtering procedure.

DIELECTRIC THIN FILM 4

The dielectric thin film 4 may be made up of various dielectric materials. No special restriction is placed on the dielectric material used. But when the recording thin film 3 contains silver oxide, there expected an increase in recording sensitivity, if the dielectric thin film 4 is made up of silicon oxide. It is understood that the silicon oxide used should preferably have a composition usually represented by $SiO_2$. When the recording thin film 3 contains iron nitride, there expects an increase in recording sensitivity, if the dielectric thin film 4 is made up of silicon nitride usually represented by $Si_3N_4$.

It is noted that in addition to the foregoing materials, various transparent ceramics and glasses may be used as the dielectric materials. Therefore a variety of dielectric materials should be used for this disc, for examples, a so-called LaSiON that contains La, Si, O and N, a so-called SiAlON that contains Si, Al, O and N or SiAlON or other systems that contain Y and so on.

The thickness of the dielectric thin film 4 can optionally be determined depending on the refractive indices and other factors of the dielectrics used. For instance, when $SiO_2$ is used as dielectric material, the dielectric thin film 4 has a thickness $tSiO_2$ of preferably about 500 to 4,000 Å, more preferably 1,800 to 3,500 Å and most preferably 2,500 to 3,300 Å in the case of the first embodiment and of preferably 1,000 to 2,000 Å in the case of the second embodiment. In addition, when other dielectric materials are applied with the refractive index differing from that of $SiO_2$, the preferable thickness $t\epsilon$ of the thin film 4 can be estimated or evaluated by multiplying the preferable thickness value $tSiO_2$ of $SiO_2$ by a value obtained by dividing the refractive index $nSiO_2$ of $SiO_2$ by the refractive index of that dielectric material $n\epsilon$, that is $t\epsilon = tSiO_2 \cdot n\epsilon/nSiO_2$. When there is a departure of the thickness of the dielectric thin film 4 from the preferable range, it is difficult to obtain a sufficient reflectivity and its change.

In the second embodiment, not only does the dielectric thin film 4 produce an effect on improving recording sensitivity, but acts as a gas barrier as well. Especially if the substrate 2 is made of such a resin as polycarbonate resin, the dielectric thin film can then well prevent undesired penetration of water vapor, oxygen and the like from the substrate 2, so that undesired degradation of the recording thin film 3 by them can be warded off.

Preferably, the dielectric thin film 4 is formed by such vapor phase epitaxy procedures as sputtering and vapor deposition.

REFLECTING THIN FILM 5

According to the first embodiment of the invention, it is preferable that the reflecting thin film 5 is constructed from a metal or alloy of high reflectivity, and is made of, for instance, Ag, Al, Au, Pt and Cu.

According to the second embodiment, it is preferable that the reflecting thin film 5 is constructed from a metal or alloy. In order to obtain high recording sensitivity, however, it is preferable that the reflecting thin film 5 is made of a shape memory alloy. A reflecting thin film of the shape memory alloy is so easily deformable by exposure to recording light that the niches 51 can be formed easily. Although no critical limitation is imposed on the composition of the shape memory alloy used, it is preferable to use shape memory alloys based on Ni-Ti or copper systems, because reflecting thin films can be produced easily. Of the copper type of shape memory alloys, a Cu-Zn-Al type alloy is particularly preferable. The compositions and properties of these shape memory alloys are set forth in, for instance, "The Bases and Industrial Techniques of Copper and Copper Alloys", published by Nippon Shindo Kyokai (May 1988). In the second embodiment, however, it is noted that the reflecting thin film 5 may be made of the above-mentioned metal of high reflectivity as well.

Preferably, the reflecting thin film 5 has a thickness of 300 to 1,500 Å. When the thickness of the film 5 is below the lower limit, some difficulty is involved in obtaining a high-sufficient reflectivity. At higher than the upper limit thickness, an improvement in reflectivity is so limited that cost-effectiveness becomes unfavorable.

Preferably, the reflecting thin film 5 is formed by such vapor phase epitaxy procedures as sputtering and vapor deposition.

PROTECTING THIN FILM 6

The protecting thin film 6 is provided to improve resistance to scuffing and resistance to corrosion, and is preferably constructed from a variety of organic materials. Most preferably, it is made of a material that is obtained by curing a radiation curing compound or its composition by such radiations as electron beams and ultraviolet rays.

The protecting thin film 6 usually has a thickness in a matter of 0.1 to 100 μm, and may be formed by ordinary procedures such as spin coating, gravure coating, spray coating and dipping.

WHAT ACTIONS ARE PRODUCED BY REFLECTIVITY CHANGES

As the optical recording medium 1 according to the first embodiment shown in FIG. 1 is irradiated from the back side of the substrate 2 by recording laser light, the recording laser light passing through the substrate 2 heats the recording thin film 3, because of its relatively large absorption. When the recording thin film contains Ag and O, $O_2$ gas is released from the solid compound $AgO_X$, and $O_2$ gas is evolved. Whereas when the recording thin film contains Fe, N, and $N_2$ is relased from $FeN_X$ and $N_2$ gas is emitted. The pressure of the resulting gas enables the voids 31 to be formed in the recording thin film 3.

On the other hand, as the temperature of the recording film increases, the temperature rapidly diffuses to the surface of the substrate 2 in the vicinity of the recording thin film 3, so that the surface of substrate 2 can soften. The pressure of the gas evolved then enables the niches 21 to be formed in the surface of the substrate 2. In some cases, it is noted that the gas pressure may cause dents in the substrate-side surfaces of the dielectric thin film 4.

In each void 31 formed by exposure to recording laser light, the optical constants such as a refractive index n (that is the real part of a refractive index) and an extinction coefficient k (that is the imaginary part of a refractive index) are different from those in the recording thin film 3. And there produces a change in the optical path length due to the presence of the niches 21. So there happenes a change in the multiple reflection conditions, which gives rise of a considerable lowering of the reflectivity of the region irradiated with recording laser light.

Each niche 21 is of about 500 to 1,500 Å, especially, about 500 to 800 Å in depth, and should be dimensionally measured as by a scanning electron microscope (SEM) or a scanning tunnel microscope (STM). In addition, the niche 21 is roughened on its bottom. Probably, this appears to be due to the gas pressure movement that bubbles out by the decomposition of the inorganic compound, and is presumed as well to make some contribution to a lowering of reflectivity.

In the second embodiment shown in FIG. 2, gas is released from the recording thin film 3 by irradiation with recording laser light, as is the case with the first embodiment. The pressure of the thus evolved gas then enables the voids 32 to be formed in the recording thin film 3. On the other hand, the reflecting thin film 5 receives the pressure of the evolved gas, so that the niches 51 can be formed in the reflecting thin film 5 as well. When the reflecting thin film 5 is constructed from a shape memory alloy, recording sensitivity increases. To put it another way, the use of the reflecting thin film of a shape memory alloy makes it easy to form the niches 51, and this then enables writing to be done with laser light of low power.

In each void 32 formed by exposure to recording laser light, the optical constants such as a refractive index n (that is the real part of the index) and an extinction coefficient k (that is the imaginary part of the index) are different from those in the recording thin film 3, and there produces a change in the optical path length due to the presence of the niches 51; that is, the total reflectivity changes by the multiple reflection conditions, which gives rise of a considerable lowering of the reflectivity of the region irradiated with recording laser light.

In view of how reflectivity changes, the depth of each niche 51 is presumed to lie in the range of about 300 to 500 Å. In addition, the niche 51 is roughened on its light-reflecting surface. Probably, this seems to be due to the gas that bubbles out by the decomposition of the inorganic compound, and is presumed as well to make some contribution to a lowering of reflectivity. How the light-reflecting surface is roughened may be confirmed as by a scanning tunnel microscope (STM). (Japanese J. Applied Physics. vol. 31 (1992) Part 1, No. 9A, (1992) PP2757)

STRUCTURE OF THE MEDIUM

While the invention has been described as being applied to a one-sided recording type of optical recording medium, it is applicable to a double-sided recording type of optical recording medium. When the invention is applied to the double-sided recording type of optical recording medium, a pair of substrates 2 and 2 are bonded together with the recording thin film 3 sealed between them. Also, the invention may be applied to a one-sided recording type of optical recording medium with a protecting sheet laminated on the protecting film 6. In this case, the protecting sheet may be made of the same material of which the substrate 2 is made, but needs not be transparent and so may be made of other materials.

EXAMPLES

In the ensuing description, the invention will be explained in further detail with reference to some illustrative examples.

Example 1

An optical recording disc sample No. 1—1 according to the first embodiment shown in FIG. 1 was prepared by forming on the surface of a substrate 2 a recording thin film 3, a dielectric thin film 4, a reflecting thin film 5 and a protecting layer 6.

Used for the substrate 2 was a disc shape of polycarbonate resin of 133 mm in diameter and 1.2 mm in thickness, which was simultaneously grooved by injection molding.

The recording thin film 3 had a thickness of 800 Å and was formed by reactive, radio-frequency sputtering in an atmosphere containing oxygen and Ar gases. Sputtering was carried out at a pressure of $5.5 \times 10^{-1}$ Pa and at oxygen and Ar gas flow rates of 10 SCCM each. In addition, the sputtering was operated by a sputtering power of 200 W, with Ag and Ni as the targets. Auger spectrometry of the recording thin film 3 indicated that oxygen of 10 at % was detected in the film to Ag+Ni. The atomic ratio of Ni to Ag+Ni is shown in Table 1.

The dielectric thin film 4 was formed to a thickness of 2,700 Å by sputtering using $SiO_2$ as the target.

The reflecting thin film 5 was formed to a thickness of 1,000 Å by sputtering using Ag as the target.

The protecting film 6 was formed by the spin coating of an ultraviolet curing resin, followed by curing by irradiation with ultraviolet rays. This film was found to have a thickness of 5 μm after curing.

Several samples were prepared with recording thin films having varying compositions and by following the procedures of preparing Sample No. 1—1.

With these samples, CD signals (3T, 5T, 7T, 9T and 11T of EFM eight-forteen modulation) were recorded and reproduced. It is noted that an 8-mW laser light was used for recording and a 0.5-mW laser light for reproduction. The wavelength of each laser light was 780 nm.

Then, each sample was stored for 24 hours in an atmosphere of 60° C. and 80% RH to measure cross talks and jitters at the initial storage stage and after storage. Used for measurement were a cross talk meter (made by TDK) and a jitter meter (Leader Electronics Co., Ltd.). The results are set out in Table 1.

TABLE 1

| | | Cross Talks | | Jitters | |
|---|---|---|---|---|---|
| Sample No. | Recording Thin film Ni/(Ag + Ni) | Initial (%) | After Storage (%) | Initial (ns) | After Storage (ns) |
| 1-1 (comparative) | 0 | 45 | 89 | 19 | 28 |
| 1-2 | 0.11 | 43 | 50 | 17 | 20 |
| 1-3 | 0.20 | 43 | 48 | 17 | 20 |
| 1-4 | 0.31 | 44 | 48 | 17 | 23 |
| 1-5 | 0.51 | 52 | 48 | 17 | 20 |

The results shown in Table 1 indicate that the degradation of cross talks and jitters is considerably inhibited.

It is noted that each sample shown in Table 1 had a reflectivity of 72–85% on its non-recorded region and a reflectivity of 23–36% on its recorded region; that is, it could make reproduction conforming to the CD standards.

It is also noted that tiny tips cut off from each samples were dipped in an acid to dissolve the reflecting, dielectric and recording thin films and remove them from the surface of the substrate in order to be observed by SEM and STM. This reveals that niches produced by the gas explosion have depth of 500–1000 Å in the surface of the recorded region of the substrate and were roughened on their bottoms probably because the gas pressure bubbled out.

It is noted that results virtually equivalent to those mentioned above were obtained, even when at least one member of Ti, Co and Cu was used in place of, or in addition to, Ni. Again, it is noted that results substantially comparable to those mentioned above were obtained, even when use was made of a recording thin film formed by reactive, high-frequency sputtering in a nitrogen and argon-containing atmosphere, using at least one member of Ni, Ti, Co and Cu and Fe as the targets and a dielectric thin film of $Si_3N_4$.

Example 2

Polycarbonate was dissolved in tetrahydrofuran to prepare a coating solution at a concentration of 20%, which was then coated on the surface of a polyolefin substrate by spin coating to form a surface layer on the surface of the substrate. The thickness of this surface layer is referred to in Table 2.

Following the procedure of making Sample No. 1 of Example 1, the substrate was provided on its surface layer with recording, dielectric and reflecting thin films as well as a protecting film to prepare an optical recording disc sample.

Moreover, a plurality of samples were prepared with surface layers having varying thicknesses. It is noted that Sample No. 2-1 was the same comparative sample as Sample No. 1.

For modulation calculation, each sample was measured in terms of the reflectivities of its non-recorded and recorded regions. Modulation was simply calculated by {(Reflectivity of the Non-recorded Region—Reflectivity of the Recorded Region)}/Reflectivity of the Non-recorded Region. The results are listed in Table 2.

TABLE 2

| Sample No. | Thickness of Surface Layer (Å) | Modulation (%) |
|---|---|---|
| 2-1 | 0 | 61 |
| 2-2 | 100 | 70 |
| 2-3 | 300 | 72 |
| 2-4 | 500 | 78 |
| 2-5 | 800 | 70 |

The results shown in Table 2 indicate that sufficient modulation is obtained by the provision of a substrate with a surface layer which has a glass transition point lower than that of the substrate, and this is true even when the substrate used is made of polyolefin.

Example 3

A substrate 2 was provided on its surface with a dielectric thin film 4, a recording thin film 3, a reflecting thin film 5 and a protecting film 6 to make an optical recording disc sample according to the second embodiment of the invention, as shown in FIG. 2. Moreover, a plurality of samples were made with recording thin films with varying compositions, as in Example 1.

The dielectric thin film 4, recording thin film 3 and protecting film 6 were formed following Example 1, with the exception that the dielectric thin film 4 was made of $SiO_2$ and had a thickness of 1,500 Å; and the recording thin films 3, when containing Ag and Fe, were of 1,000 Å and 800 Å in thickness, respectively. Each reflecting thin film 5 was formed to a thickness of 1,000 Å by means of sputtering making use of a Cu-Zn-Al alloy as the target.

Similar measurement of each sample as in Example 1 indicated that increases in the cross talks and jitters were inhibited depending on the amount or amounts of the element or elements M added as in Example 1.

Each sample was found to have a reflectivity of 40-50% on the non-recorded region and a reflectivity of 20-38% on the recorded region.

No appreciable error rate increase of each sample was also found, when measured after stored at 60° C. and 80% RH for 1,000 hours for endurance and storage testing.

As will be understood from what has been described, the optical recording media of the invention are high-enough in terms of resistance to light and can be stored over an extended period with improved reliability, both before and after recording, because any substance of low resistance to light, such as an organic dye, is not used. It is also possible to inhibit increases in cross talks and jitters after long term storage at high temperature and high humidity, because the recording thin film contains the element or elements M.

To be more specific, the first embodiment of the invention may be used in the form of a write-once type of optical recording disc conforming to the CD standards, because the non-recorded region has a reflectivity of about 70% or more, while the recorded region has a reflectivity reduced to about 50% or less, in particular, about 20% or less. Moreover, this embodiment, because of having a high recording sensitivity, enables recording to be made with laser light of power that is as low as 8 mW or less, for instance.

With the second embodiment of the invention, on the other hand, even higher reliability is achieved, because the dielectric thin film located between the substrate and the recording thin film serves well to prevent penetration of water vapor or oxygen through the substrate.

We claim:

1. An optical recording medium comprising on the surface of a substrate a recording thin film, a dielectric thin film and a reflecting thin film in the order mentioned, said recording thin film containing Ag, M and O, wherein M is at least one member selected from the group consisting of Ni, Ti, Co and Cu, and said recording thin film is decomposable to release oxygen by the heat generated from the incidence of recording light to form voids resulting from the pressure of the resulting gas.

2. An optical recording medium as recited in claim 1, wherein said recording thin film has an M/(Ag+M) atomic ratio exceeding zero and extending up to 0.5.

3. An optical recording medium as recited in claim 1, which includes between said substrate and said recording thin film and on said substrate a surface layer having a glass transition point lower than that of said substrate.

4. An optical recording medium as recited in claim 3, wherein said recording thin film has an M/(Ag+M) atomic ratio exceeding zero and extending up to 0.5.

5. An optical recording medium as recited in claim 3, wherein said substrate comprises polyolefin and said surface layer comprises polycarbonate.

6. An optical recording medium as recited in claim 5, wherein said recording thin film has an M/(Ag+M) atomic ratio exceeding zero and extending up to 0.5.

7. An optical recording medium comprising on the surface of a substrate a dielectric thin film, a recording thin film and a reflecting thin film in the order mentioned, wherein said recording thin film containing Ag, M and O, wherein M is at least one member selected from the group consisting of Ni, Ti, Co, and Cu, and said recording thin film is decomposable to release oxygen by the heat generated from the incidence of recording light to form voids resulting from the pressure of the resulting gas.

8. An optical recording medium as recited in claim 7, wherein said recording thin film has an M/(Ag+M) atomic ratio exceeding zero and extending up to 0.5.

* * * * *